United States Patent Office 3,792,011
Patented Feb. 12, 1974

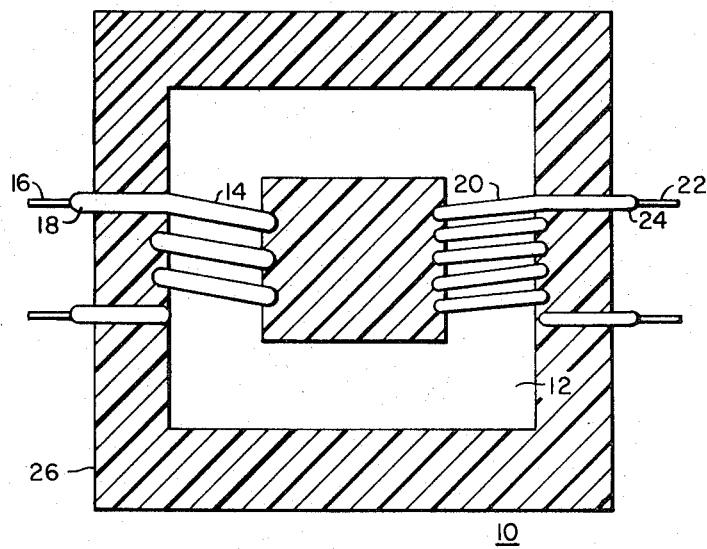

3,792,011
LOW-COST RESINOUS COMPOSITIONS COMPRISING NON-GLYCIDYL ETHER EPOXIDES
James D. B. Smith, Turtle Creek, and Robert N. Kauffman, Monroeville, Pa., assignors to Westinghouse Electric Corporation, Pittsburgh, Pa.
Filed Oct. 14, 1971, Ser. No. 189,090
Int. Cl. C08g 51/04
U.S. Cl. 260—37 EP   6 Claims

ABSTRACT OF THE DISCLOSURE

A resinous composition, suitable as a low cost potting compound, is made from a mixture containing about 90 to 120 parts of a cycloaliphatic or acyclic aliphatic non-glycidyl ether epoxy resin, about 5 to 120 parts of a diglycidyl ether epoxy resin, about 50 to 200 parts of an acid anhydride and about 0.08 to 0.9 part of a quaternary organic phosphonium salt acting as a latent catalyst.

BACKGROUND OF THE INVENTION

Although the first and most important epoxy resins are of the glycidyl ether type, other epoxides have been commercially marketed in recent years. Such materials are the cycloaliphatic and acyclic aliphatic non-glycidyl ether epoxides. These types of epoxides are less viscous and reactive than the typical diglycidyl ether of bisphenol A type resins, and have generally been used as diluents and plasticizers for the bisphenol A type resins. As such, they have generally been a minor component in the resinous composition, comprising up to about 40 but generally less than 10 parts per 100 parts bisphenol A type resin.

Because of their low viscosity, cycloaliphatic epoxides would make useful injection molding and impregnating compositions and because of their lost cost, acyclic aliphatic epoxides would make useful potting compositions. Gel time of these epoxides with basic curing agents such as amines and basic accelerators such as imidazoles is relatively slow. Basic curing agents may also present a compatibility problem with aliphatic epoxides. Gel time of these epoxides with acid anhydrides and basic accelerators such as benzyldimethyl aniline and imidazoles are suitable, but the storage properties of such compositions have been generally unsuitable for commercial applications.

There is a need for a primarily non-glycidyl ether epoxide composition, having both commercially acceptable gel times and storage life, for use as inexpensive potting compounds for transformers, etc. and for use as impregnating varnishes for large rotating apparatus insulation.

Such a composition would require the proper formulation of epoxide, inexpensive resinous hardener or extender, curing agent and latent catalyst. The latent catalyst is required to give a rapid cure at between 135° to 180° C., and a storage life of at least several months at room temperature, without adversely affecting the electrical and mechanical properties of the cured resin system.

Several latent catalysts have appeared on the commercial scene in recent years. Included are quaternary ammonium halides such as benzyltrimethyl-ammonium chloride, stannous octotate, "extra-coordinate" siliconate salts, triethanolamine borate, triethanolamine titanate and various other metal chelates. However, all of these materials have been rejected for one reason or another.

SUMMARY OF THE INVENTION

It has been discovered that low cost resinous compositions, solving the aforedescribed need, can be made by admixing about 90 to 120 parts of a cycloaliphatic or acyclic aliphatic non-glycidyl ether epoxide about 5 to 120 parts of a diglycidyl ether epoxy resin about 50 to 220 parts of an acid anhydride curing agent and about 0.08 to 0.9 part of a quaternary organic phosphonium salt acting as a latent catalyst.

Very good storage properties at ambient temperatures have been found, particularly with the aliphatic type epoxides. Electrical measurements on the cured system using these catalysts with aliphatic epoxides show suitably low dielectric constants and power factor values particularly for low voltage insulation.

This discovery allows formulation of long life, low viscosity, low shrinkage, rapid cure epoxy resin systems using cycloaliphatic and acyclic aliphatic epoxides as a base for the formulation. The cycloaliphatic system could find use as an inexpensive impregnating varnish for high voltage insulation. The even cheaper aliphatic based system could find use as a potting compound, and since it has good "wetting" or permeation properties when mixed with a filler such as sand, it could be used for potting transformer components.

BRIEF DESCRIPTION OF THE DRAWING

For a better understanding of the invention, reference may be made to the preferred embodiment, exemplary of the invention shown in the accompanying drawing, in which the figure is a vertical sectional view through a transformer.

DESCRIPTION OF THE PREFERRED EMBODIMENTS

It has been found that quaternary phosphonium salts are very effective latent catalysts for the anhydride cure of cycloaliphatic and acyclic aliphatic type epoxides. The term "latent catalyst" is taken to mean the ability of these quaternary phosphonium salts to speed up curing rates at elevated temperatures (e.g., over 100° C.) while exhibiting little or no cure at room temperature, thus giving good storage properties.

The quaternary phosphonium compounds have the general structural formula:

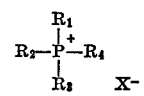

where $R_1$, $R_2$, $R_3$ and $R_4$ are aryl radicals or alkyl radicals having 1 to 21 carbon atoms with preferred alkyl radicals having 4 to 12 carbons. X, bonded to the phosphorus, is a propionate, acetate, butyrate, isobutyrate or dimethylphosphate radical.

The quaternary phosphonium salts must be mixed in critical proportions with the epoxide anhydride system. The useful weight percent range of ingredients to provide a good compromise of low cost, rapid cure time, filler "wetting" low viscosity, low shrinkage after cure, good storage life and electrical and mechanical properties, is a cycloaliphatic or acyclic aliphatic non-diglycidyl ether epoxide:glycidyl ether epoxy:acid anhydride:quaternary organic phosphonium salt ratio of 90 to 120:5 to 120:50 to 220:0.08 to 0.9 with a preferred range of about 90 to 120:25 to 100:75 to 100:0.2 to 0.9 respectively. Examples of suitable quaternary phosphonium salts which can be used alone or in admixtures would include, for example, tetrabutylphosphonium acetate, methyltrioctylphosphonium dimethylphosphate, and methyltriphenylphosphonium dimethylphosphate.

The cycloaliphatic and acyclic aliphatic type epoxides employed as the basic ingredient in the invention are selected from non-glycidyl ether epoxides. These are generally prepared by epoxidizing unsaturated aliphatic or unsaturated aromatic hydrocarbon compounds, such as olefins and cyclo-olefins, using hydrogen peroxide or peracids such as peracetic acid and perbenzoic acid:

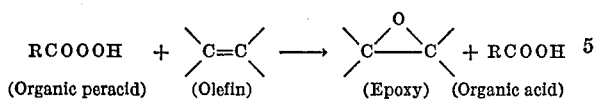

(Organic peracid) (Olefin) (Epoxy) (Organic acid)

The organic peracids are generally prepared by reacting hydrogen peroxide with either carboxylic acids, acid chlorides or ketones to give the compound R—COOOH.

Such non-glycidyl ether epoxides are characterized by the absence of the ether oxygen near to the epoxide group and are selected from those which contain a ring structure as well as an epoxide group in the molecule, the cycloaliphatic epoxides; and those which have an essentially linear structure onto which are attached epoxide groups, the acyclic aliphatic epoxides.

Examples of cycloaliphatic epoxides would include 3,4-epoxycyclohexylmethyl-3,4-epoxy cyclohexane carboxylate; vinyl cyclohexane dioxide; 3,4 - epoxy-6-methylcyclohexyl methyl-3,4 - epoxy-6-methylcyclohexane carboxylate and dicyclopentadiene dioxide, having the following respective structures:

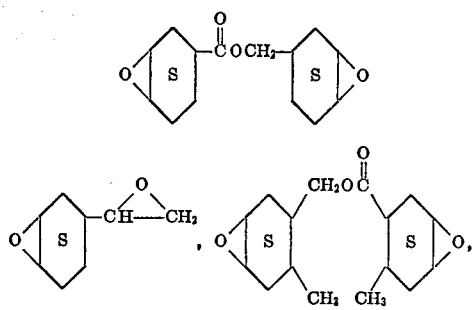

and

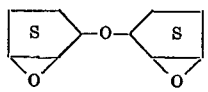

The cycloaliphatic epoxides are normally epoxides produced by the peroxidation of cyclic olefins. A distinguishing feature of many of the non-glycidyl ether cycloaliphatic epoxides is the location of the epoxy group(s) on a ring structure rather than on an aliphatic side chain. Generally, the non-glycidyl ether cycloaliphatic epoxide will have the formula selected from the group of:

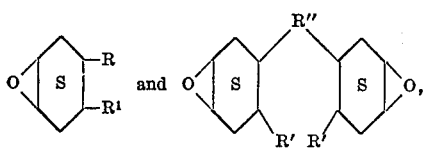

where S stands for a saturated ring structure, R is selected from the group consisting of CHOCH$_2$, O(CH$_2$)$_n$CHOCH$_2$ and OC(CH$_3$)$_2$CHOCH$_2$ radicals where $n=1$ to 5, R' is selected from the group consisting of hydrogen, methyl, ethyl, propyl, butyl and benzyl radicals and R'' is selected from the group consisting of CH$_2$OOC, and

CH$_2$OO(CH$_2$)$_4$COO radicals.

Examples of acyclic aliphatic epoxides would include epoxidized diene polymers, epoxidized polyesters and epoxidized naturally occuring fatty acid oils.

Typical of the epoxidized diene polymers are products produced by treatment of a polyisoprene or polybutadiene resin with peracetic acid; for example:

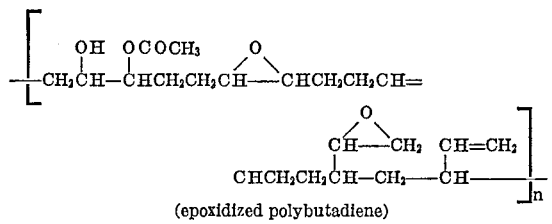

(epoxidized polybutadiene)

where $n=25$ to 250.

Suitable dienes would include those having from 4 to 15 carbon atoms per molecule and the resulting epoxidized diene polymers could have from 3 to 8 percent by weight oxirane (epoxy) oxygen content.

The natural fatty acid oils, generally composed of glycerol (HOCH$_2$CHOHCH$_2$OH) and long chain saturated and unsaturated acids, or from 14 to 25 carbon atoms per molecule, contain one or more unsaturated linkages, (their iodine value of unsaturation will range from 8 to 250).

Soybean oil, for example, generally comprises several saturated acidic components, such as palmitic (C$_{16}$H$_{32}$O$_2$), stearic (C$_{18}$H$_{36}$O$_2$) and arachidic (C$_{20}$H$_{40}$O$_2$) acid components and a majority of unsaturated acidic components, such as oleic (C$_{18}$H$_{34}$O$_2$), linolenic (C$_{18}$H$_{32}$O$_2$), linoleic (C$_{18}$H$_{30}$O$_2$) and arachidonic (C$_{20}$H$_{32}$O$_2$) acid components. Tall oil, the tallates of which are particulary suitable in this invention, generally comprises 30 to 35 percent fatty acids such as oleic, linoleic and palmitic acids and 35 to 60 percent resin acids such as abietic (C$_{19}$H$_{29}$COOH) acid, with 5 to 10 percent unsaponifiables.

With such oils, some percentage of the epoxidized composition will be nonreactive with the peracid used for synthesis, since this percentage contains no unsaturation. Some percentage of the unsaturated acid component will also remain unreacted during synthesis; thus the resulting glycidyl ester of a long chain fatty acid will consist of a variety of species differing in chemical activity.

Epoxidized triglyceride drying oils made from triesters of glycerol and long chain unsaturated acids may be considered to have the skeletal structure:

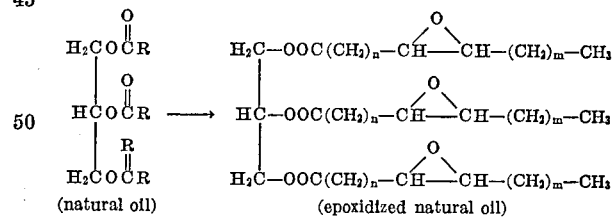

(natural oil) (epoxidized natural oil)

where $n$ and $m$ range from about 6 to 12 and R represents the saturated and unsaturated acid component. The number of epoxy groups per chain will vary, but for modified soybean oils there are an average of about 4 per chain and for epoxidized linseed oils there are an average of about 6 per chain. The epoxidized natural oils should have from about 5 to 8% by weight oxirane (epoxy) oxygen content.

Synthetic polyesters suitable for making epoxy esters are derived from the reaction of organic polybasic acids or anhydrides with polyols such as primary diols to provide a diester:

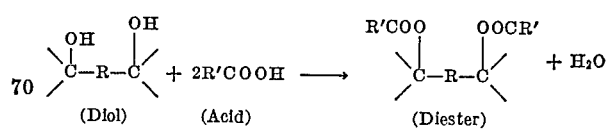

(Diol) (Acid) (Diester)

Either the acid or the polyol or both may contain the requisite unsaturation for R and R' in the formula above. Examples of suitable polyepoxides based on unsaturated polyesters would be those derived from oleic ($C_{18}H_{34}O_2$) or linoleic ($C_{18}H_{30}O_2$) unsaturated acids and ethylene glycol ($CH_2OHCH_2OH$), glycerol $$CH_2OHCHOHCH_2OH)$$

and pentaerythritol $C(CH_2OH)_4$ and reacted with peracetic acid. Generally, R in the formula above can contain from 2 to 10 carbons and R' from 10 to 24 carbons.

The epoxidized diester will have the general formula

, where

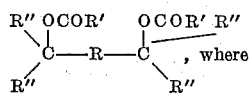

R can be $CH_2$, $C(CH_3)_2$, and $(CH_2)_{n=2\ to\ 10}$;

R" can be H, $CH_3$, , —$CH_3$ and $CH(CH_3)_2$ and

OCOR' can be oleic, linoleic, gadoleic, palmitoleic and ricinoleic with R' having 10 to 24 carbons and a degree of unsaturation of 1 to 4 double bonds per OCOR' unit. R' could be represented as:

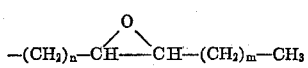

where n and m range from about 5 to 12. The epoxidized esters should have from about 4 to 7% by weight oxirane (epoxy) oxygen content.

A complete description of epoxidation of dienes, natural oils and synthetic polyesters can be found in the Handbook of Epoxy Resins, by Lee and Neville, chapter 3, pages 9–17, McGraw-Hill (1967), herein incorporated by reference.

These non-glycidyl ether epoxides may be characterized by reference to their epoxy equivalent weight, which is defined as the weight of epoxide in grams which contains one gram equivalent of epoxy. In the present invention, the suitable non-glycidyl ether epoxides are characterized by an epoxy equivalent weight of from about 75 to 250 for the cycloaliphatic type, and from about 250 to 600 for the acyclic aliphatic type. Within this range there is a preferred range of epoxy equivalency of from about 125 to 160 for the cycloaliphatic type and from about 250 to 420 for the acyclic aliphatic type.

The glycidyl polyether of a dihydric phenol which may be employed in the invention, in some cases as a hardener component and in other cases as an extender, is obtainable by reacting epichlorohydrin with a dihydric phenol in an alkaline medium at about 50° C. using 1 to 2 or more mols of epichlorohydrin per mol of dihydric phenol. The resinous product, instead of being a single simple compound, is generally a complex mixture of glycidyl polyethers, but the principal product may be represented by the formula:

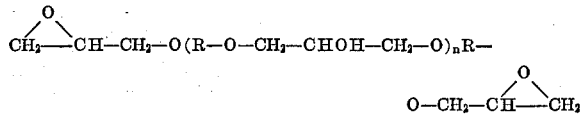

where n is an integer of the series 0, 1, 2, 3, . . . , and R represents the divalent hydrocarbon radical of the dihydric phenol. Typically R is:

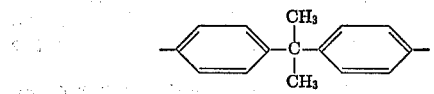

The glycidyl polyethers of a dihydric phenol used in the invention have a 1,2 epoxy equivalency between 1.0 and 2.0. By the epoxy equivalency reference is made to the average number of 1,2 epoxy groups,

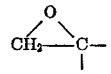

contained in the average molecule of the glycidyl ether. These glycidyl polyethers are commonly called bisphenol A type epoxy resins. Bisphenol A (p,p-dihydroxy-diphenyl dimethyl methane) is the dihydric phenol used in these epoxides.

Typical epoxy resins of bisphenol A are readily available in commercial quantities and reference may be made to the "Handbook of Epoxy Resins," by Lee and Neville for a complete description of their synthesis or to U.S. Pats.: 2,324,483; 2,444,333; 2,500,600; 2,511,913; 2,558,-949; 2,582,985; 2,615,007 and 2,633,458.

The glycidyl ether epoxy resins may also be characterized by reference to their epoxy equivalent weight, which is the mean molecular weight of the particular resin divided by the mean number of epoxy radicals per molecule. In the present invention, the suitable glycidyl ether epoxy resins are characterized by an epoxy equivalent weight of from about 130 to about 3000. Within this range there is a preferred range of epoxy equivalent weight of from about 350 to about 800.

These glycidyl polyether epoxy resins can be compatibilized with the natural oils heretofore described, especially linseed oil, to produce a low cost, homogeneous, resin component with residual reactive epoxy units suitable for use in this invention. A particularly suitable oil extended bisphenol A epoxy resin would include a suitably catalyzed mixture of linseed oil; bisphenol A-type resin in the weight ratio of 60:40. This type resin gives greater flexibility while lowering cost.

The acid anhydrides which are to be used in carrying out the invention include the conventional mono- and poly-functional anhydrides. Typical of the mono-functional anhydrides are hexahydrophthalic anhydride, 1-methylhexahydrophthalic anhydride, tetrahydrophthalic anhydride, 1-methyltetrahydrophthalic anhydride, phthalic anhydride, nadic anhydride, nadic methyl anhydride and the like. Polyfunctional anhydrides which may be employed include pyromellitic dianhydride, polyazelaic polyanhydride, the reaction product of trimellitic anhydride and a glycol, the benzophenone tetracarboxylic acid dianhydride. The anhydrides may be used singly or in admixture.

Thixotropic agents, such as $SiO_2$ in gel composition and pigments such as $TiO_2$ may be used as aids in fluidizing the composition or enhancing the color tones of the cured resins. Similarly, various fillers, such as silica, quartz, beryllium aluminum silicate, lithium aluminum silicate and mixtures thereof in average particle sizes from about 10 to 300 microns may be employed up to about 200 parts per 100 parts combined epoxy to improve electrical properties and cut costs of the resin formulation.

Electrical transformers, rectifiers and electronic components can be potted or cast within the completely reactive catalyzed epoxide compositions of this invention. Referring to the drawing, there is illustrated a potted transformer 10 which comprises a magnetic core 12 provided with one winding 14 which comprises an electrical conductor 16 which is insulated with insulation 18 and another winding 20 which comprises a conductor 22 also insulated with insulation 24. The magnetic core 12 with its associated windings 14 and 20 disposed about the core are completely potted in the epoxide resin 26 of this invention.

EXAMPLE I

A resin formulation was made containing 80 grams of an epoxidized polyester having an oxirane (epoxy) oxygen content of 5 weight percent, an epoxy equivalent weight of between about 300 to 400 and a viscosity at 25° C. of 22 cp. (sold commercially by Union Carbide under the trade name Flexol GPE Plasticizer), 46.5 grams of 1-methyltetrahydrophthalic anhydride, 0.20 gram of methyltrioctylphosphonium-dimethylphosphate as latent accelerator and 20 grams of a liquid diglycidyl ether of bisphenol A resin, having an epoxy equivalent weight of 185–192 and a viscosity at 25° C. of 10000–16000 cp., (sold commercially by Shell Chemical Co., under the trade name Epon 828).

This composition provided a non-glycidyl ether acyclic aliphatic epoxy ester:glycidyl ether epoxy resin:acid anhydride:quaternary organic phosphonium salt weight ratio of 100:25:58:0.25.

The components were poured into a container, stirred at room temperature and then put in a paint mixer for about five minutes. Ten gram samples were then poured into flat 2" diameter aluminum dishes. These samples were placed in a 135° C. oven and inspected every 20 to 30 minutes to record the gel time of the samples. The approximate gel time was considered to be the amount of time it took the formulation to start to solidify.

Storage properties of the formulation were found by measuring viscosities at 27° C. in Gardner-Holdt bubble tubes. Measurements were usually taken at one-week intervals. The termination of the catalyzed lifetime (pot-life) of these formulations were considered to be when the viscosity reached a value of about 1500 cp. at 25° C.

EXAMPLE 2

A resin formulation was made containing 50 grams of an epoxidized polyester having an oxirane (epoxy) oxygen content of 5 weight percent, an epoxy equivalent weight of between about 300 to 400 and a viscosity at 25° C. of 22 cp. (sold commercially by Union Carbide under the trade name Flexol GPE Plasticizer), 33 grams of 1-methyltetrahydrophthalic anhydride, 0.30 gram of methyltrioctylphosphonium-dimethyl phosphate as latent accelerator and 50 grams of a natural oil extended glycidyl ether epoxy resin. This epoxy resin had an epoxy equivalent weight of 490 and was composed of an admixture of 30 grams of linseed oil having an iodine value of 170–185 (5 weight percent palmitic acid, 3.5 weight percent stearic acid, 5 weight percent oleic acid, 61.5 weight percent linoleic acid, 25 weight percent linolenic acid; percent fatty acid by weight) and 20 grams of a liquid diglycidyl ether of bisphenol A resin component, having an epoxy equivalent weight of 185–192 and a viscosity of 25° C. of 10,000–16,000 (sold commercially by Shell Chemical Co. under the trade name Epon 828) catalyzed with 0.7 gram of lithium ricinoleate.

This composition had an initial viscosity at 25° C. of 50 cp. and provided a non-glycidyl ether acyclic aliphatic epoxy ester oil extended glycidyl ether epoxy resin:acid anhydride:quaternary organic phosphonium salt weight ratio of 100:100:66:0.6. The ingredients were reacted and tests run as in Example 1.

To evaluate the effect of phosphonium accelerators on the electrical properties of the cured resin, ⅛" thick castings were cured in an oven using heating cycle of 1 hour at 80° C., 2 hours at 135° C. and 16 hours at 170° C., and the dielectric constant and 60 Hz. power factors (100×tan δ) were obtained at 75° (ASTM designation D150–65T). The results of these tests were recorded in Table 1.

EXAMPLE 3

A resin formulation was made containing 60 grams of octyl epoxy tallate (octyl ester of the fatty acids of tall oil), having an oxirane (epoxy) oxygen value of 5 weight percent (epoxide content) and a viscosity at 20° C. of 35 cp. (sold commercially by Union Carbide under the trade name Flexol EP–8 Plasticizer), 46.5 grams of 1 - methyltetrahydrophthalic anhydride, 0.1 gram of methyltrioctyl phosphonium-dimethyl phosphate as latent accelerator, 1.0 gram of furfuryl alcohol accelerator and 40 grams of a liquid diglycidyl ether of bisphenol A resin, having an epoxy equivalent weight of 185–192 and a viscosity at 25° C. of 10,000–16,000 cp. (sold commercially by Shell Chemical Co. under the trade name Epon 828).

This composition had an initial viscosity at 25° C. of 75 cp. and provided a non-glycidyl ether acyclic aliphatic epoxy oil glycidyl ether epoxy resin:acid anhydride: quaternary organic phosphonium salt weight ratio of 100:66:77:0.16. The ingredients were reacted and tests run as in Example 2.

EXAMPLE 4

A resin formulation was made containing 70 grams of 3,4 - epoxycyclohexylmethyl 3,4-epoxy cyclohexane carboxylate having an epoxy equivalent weight of about 133 and a viscosity at 25° C. of 350–450 cp. (sold commercially by Union Carbide under the trade name ERL–4221), 140 grams of 1-methyltetrahydrophthalic anhydride, 0.08 gram of methyltrioctylphosphonium-dimethylphosphate as latent accelerator and 30 grams of 1,4-butanediol diglycidyl ether, having an epoxy equivalent weight of about 134 and a viscosity at 25° C. of 15 cp. (sold commercially by Ciba Products Co. under the trade name Araldite RD–2).

This composition had an initial viscosity at 27° C. of 75 cp. and provided a non-glycidyl ether cycloaliphatic epoxy:glycidyl ether epoxy:acid anhydride:quaternary organic phosphonium salt weight ratio of 100:43:200:0.12. The ingredients were reacted and tests run as in Example 1 except that gel times were recorded in a 170° C. oven.

EXAMPLE 5

A resin formulation was made containing 50 grams of octyl epoxy tallate (octyl ester of the fatty acids of tall oil), having an oxirane (epoxy) oxygen value of 5 weight percent, and a viscosity at 20° C. of 35 cp. (sold commercially by Union Carbide under the trade name Flexol EP–8 Plasticizer), 33 grams of 1 - methyltetrahydrophthalic anhydride, 0.30 gram of methyltrioctylphosphonium-dimethyl phosphate as latent accelerator and 50 grams of a natural oil extended glycidyl ether epoxy resin. This glycidyl ether epoxy had an epoxy equivalent weight of 490 and was composed of an admixture of 30 grams of linseed oil component and 20 grams of a liquid diglycidyl ether of bisphenol A resin component having an epoxy equivalent weight of 185–192 and a viscosity at 25° C. of 10,000–16,000 (sold commercially by Shell Chemical Co. under the trade name Epon 828) catalyzed with 0.7 gram of lithium ricinoleate.

This composition had an initial viscosity at 27° C. of 65 cp. and provided a non-glycidyl ether acyclic aliphatic epoxy oil:oil extended glycidyl ether epoxy resin acid anhydride:quaternary organic phosphonium salt weight ratio of 100:100:66:0.6. The ingredients were reacted and tests run as in Example 1.

EXAMPLE 6

A resin formulation was made containing 70 grams of a high molecular weight soybean oil epoxide, having an epoxide content of 7–8% by weight and a viscosity at 25° C. of 340 cp. (sold commercially by Rohm and Haas Co. under the trade name Paraplex G60), 60 grams of 1 - methyltetrahydrophthalic anhydride, 0.10 gram of methyltrioctylphosphonium-dimethyl phosphate as latent accelerator and 30 grams of a liquid diglycidyl ether of bisphenol A resin, having an epoxy equivalent weight of 185–192 and a viscosity at 25° C. of 10,000–16,000 cp. (sold commercially by Shell Chemical Co. under the trade name Epon 828).

This composition had an initial viscosity at 27° C. of 320 cp. and provided a non-glycidyl ether acyclic aliphatic epoxy oil:glycidyl ether epoxy resin acid anhydride:quaternary organic phosphonium salt weight ratio of 100:43:86:0.14. The ingredients were reacted and tests run as in Example 1.

EXAMPLE 7

A resin formulation was made containing 50 grams of an epoxidized polyester having an epoxy equivalent weight of between about 300 to 400 and a viscosity at 25° C. of 22 cp. (sold commercially by Union Carbide under the trade name Flexol GPE Plasticizer), 50 grams of 1 - methyltetrahydrophthalic anhydride, 0.40 gram of methyltrioctylphosphonium-dimethyl phosphate as latent accelerator and 50 grams of a natural oil extended glycidyl ether epoxy resin. This glycidyl ether epoxy had an epoxy equivalent weight of 520 and was composed of an admixture of 30 grams of a linseed oil component and 20 grams of a liquid diglycidyl ether of bisphenol A resin component having an epoxy equivalent weight of 185–192 and a viscosity at 25° C. of 10,000–16,000 (sold commercially by Shell Chemical Co. under the trade name Epon 828) catalyzed with 0.7 gram of lithium ricinoleate.

This composition had an initial viscosity at 25° C. of 50 cp. and provided a non-glycidyl ether acyclic aliphatic epoxy ester oil extended glycidyl ether epoxy resin acid anhydride:quaternary organic phosphonium salt weight ratio of 100:100:100:0.8. The ingredients were reacted and tests run as in Example 1.

EXAMPLE 8

A resin formulation was made containing 100 grams of a high molecular weight soybean oil epoxide having an epoxide content of 7–8% by weight and a viscosity at 25° C. of 340 cp. (sold commercially by Rohm and Haas Co. under the trade name Paraplex G60), 52 grams of 1 - methyltetrahydrophthalic anhydride and 0.10 gram of methyltrioctylphosphonium-dimethyl phosphate as latent accelerator. No glycidyl ether resin was used in this composition.

This composition had an initial viscosity at 27° C. of 260 cp. and provided a non-glycidyl ether acyclic aliphatic epoxy oil:glycidyl ether epoxy resin acid anhydride:quaternary organic phosphonium salt weight ratio of 100:0:52:0.1. The ingredients were reacted and tests run as in Example 1.

The results of the tests for gel time, pot life, dielectric constant and power factor for Examples 1 to 8 are shown below in Table 1:

TABLE 1

| Sample | Weight ratio [1] | Gel time at 135° C. (minutes) | Pot life at 25–27° C. (days) | Power factor at 75° C. (100× tan δ) | Dielectric constant at 75° C |
|---|---|---|---|---|---|
| Ex. 1 | (100:25:58:0.25) | 120 | 100+ | | |
| Ex. 2 | (100:100:66:0.6) | 90 | 150+ | 57 | 6.5 |
| Ex. 3 | (100:66:77:0.16) | 120 | 135 | 5.9 | 5.8 |
| Ex. 4 | (100:43:200:0.12) | [2] 30 | 30+ | | |
| Ex. 5 | (100:100:66:0.6) | 90 | 150+ | | |
| Ex. 6 | (100:43:86:0.14) | 120 | 55 | | |
| Ex. 7 | (100:100:100:0.8) | 120 | 125 | | |
| Ex. 8 | (100:0:52:0.10) | 300 | 100 | | |

[1] Non-glycidyl ether cycloaliphatic or acyclic epoxide:diglycidyl ether epoxy resin:anhydride:phosphonium salt.
[2] At 170° C.

As shown by the data in Table 1, the phosphonium compounds display high catalytic behavior for the resinous compositions of this invention, even at concentrations as low as about 0.12 part per 100 parts cycloaliphatic or aliphatic epoxide. Sample 8 shows the necessity of a glycidyl ether resin component to provide suitable gel times. A comparison of the storage data reveals that the resinous compositions of this invention provide suitable pot life values of about 30–150 days. The results indicate that acceptably low power factors are present at 75° C. and seem to be substantially lower than those found for epoxy resins cured by a boron trifluoride-monoethylamine complex, where values of about 150 are usually found in the same temperature range.

Some of the acyclic aliphatic epoxides gave on curing somewhat soft, but compatible, cakes with hardnesses ranging from 25 to 85 on the Shore D scale and would be useful as cheap potting compound for transformers and other electrical apparatus.

Further potting tests were run at 135° C. on the composition of Example 2, also containing 80% by weight of sand, having an average particle size of about 175 microns. The composition showed good permeation and wetting of the sand and the filled composition showed acceptable hardness characteristics after curing for 3 hours at 135° C. This composition has been used in potting coils and results have indicated that it is very suitable in terms of physical and electrical properties as a low cost potting composition.

Transformers have also been potted with the composition of Example 7, using about 80% by weight of sand. Thermal stability studies indicated excellent thermal endurance for these resins making them very useful varnishes and encapsulants for electrical apparatus.

We claim:
1. A cured resinous composition suitable for insulating electrical apparatus comprising by weight the:
   (A) about 90 to 120 parts of a non-glycidyl ether epoxide selected from the group consisting of non-glycidyl ether cycloaliphatic epoxides having an epoxy equivalent weight of from about 75 to 250 and non-glycidyl ether acyclic aliphatic epoxides having an epoxy equivalent weight of from about 250 to 600;
   (B) about 5 to 120 parts of a glycidyl ether epoxy resin having an epoxy equivalent weight of from about 130 to 3000;
   (C) about 50 to 220 parts of an acid anhydride; and
   (D) about 0.08 to 0.9 part of a quaternary organic phosphonium salt acting as latent catalyst and having the structural formula:

where $R_1$, $R_2$, $R_3$ and $R_4$ are selected from the group consisting of alkyl and aryl radicals and X is selected from the group consisting of propionate, acetate, butyrate, isobutyrate and dimethyl phosphate radicals.

2. The composition of claim 1 wherein the non-glycidyl ether epoxide is the reaction product of an unsaturated hydrocarbon and a compound selected from the group consisting of hydrogen peroxide and peracids.

3. The composition of claim 2 wherein the glycidyl ether epoxy resin comprises a bisphenol A epoxy resin and the unsaturated hydrocarbon is selected from the group consisting of unsaturated olefins and unsaturated cycloolefins.

4. The composition of claim 2 wherein the acyclic aliphatic epoxide is selected from the group of aliphatic epoxy esters and natural fatty acid epoxy oils.

5. The composition of claim 2 also containing up to about 200 parts filler particles, of average particle sizes from about 10 to 300 microns, per 100 parts (A) and (B).

6. The composition of claim 3 wherein the quaternary phosphonium salts are selected from the group consisting of tetrabutylphosphonium acetate, methyltrioctylphosphonium dimethyl phosphate, methylphenylphosphonium dimethyl phosphate, methyltributylphosphonium dimethyl phosphate iodide and mixtures thereof, and the acid anhydride is selected from the group consisting of hexahydrophthalic anhydride, 1-methylhexahydrophthalic anhydride:methyltetrahydrophthalic anhydride, phthalic anhydride, nadic anhydride, nadic methylanhydride, pyromellitic dianhydride, polyazelaic polyanhydride, benzophenone tetracarboxylic acid dianhydride and mixtures thereof.

References Cited

UNITED STATES PATENTS

| | | | |
|---|---|---|---|
| 3,422,046 | 11/1968 | Payne | 260—2 EA |
| 3,488,404 | 1/1970 | Parker | 260—830 TW |
| 3,100,756 | 8/1963 | Fry | 260—830 TWX |
| 3,567,797 | 3/1971 | Mango et al. | 260—830 TW |
| 3,294,863 | 12/1966 | De Acetis et al. | 260—830 TW |
| 3,547,885 | 12/1970 | Dante et al. | 260—47 EC |
| 2,768,153 | 10/1956 | Shokal | 260—47 EA |

LEWIS T. JACOBS, Primary Examiner

U.S. Cl. X.R.

260—47 EA, 830 TW

UNITED STATES PATENT OFFICE
CERTIFICATE OF CORRECTION

Patent No. 3,792,011  Dated February 12, 1974

Inventor(s) James D. B. Smith and Robert N. Kauffman

It is certified that error appears in the above-identified patent and that said Letters Patent are hereby corrected as shown below:

Claim 1, column 10, line 27, after "the" insert -- reaction product of --.

Claim 6, column 10, line 71, cancel "methylphenylphosphonium" and substitute -- methyltriphenylphosphonium --.

Claim 6, column 10, line 73, cancel "iodide".

Signed and sealed this 1st day of October 1974.

(SEAL)
Attest:

McCOY M. GIBSON JR.
Attesting Officer

C. MARSHALL DANN
Commissioner of Patents